United States Patent [19]
Brown

[11] 3,780,311
[45] Dec. 18, 1973

[54] BREATH ALCOHOL DETECTOR AND AUTOMOTIVE IGNITION INTERLOCK EMPLOYING SAME

[75] Inventor: Verne R. Brown, Ann Arbor, Mich.

[73] Assignee: Environmental Metrology Corporation, Ann Arbor, Mich.

[22] Filed: June 14, 1972

[21] Appl. No.: 262,852

[52] U.S. Cl.............. 307/10 R, 128/2 C, 340/279
[51] Int. Cl. ........................................... H01h 35/00
[58] Field of Search.................. 307/10 AT, 10 R; 180/99; 340/53, 54, 64, 279; 128/2 C

[56] References Cited
UNITED STATES PATENTS

| | | |
|---|---|---|
| 3,186,508 | 6/1965 | Lamont.................... 340/279 X |
| 3,631,436 | 1/1972 | Taguchi........................ 340/237 |
| 3,311,187 | 3/1967 | Haggard................. 307/10 AT X |

Primary Examiner—Robert K. Schaefer
Assistant Examiner—William J. Smith
Attorney—Gerald E. McGlynn, Jr. et al.

[57] ABSTRACT

A breath alcohol detector in an automotive ignition system interlock such that an operator cannot start the automobile engine until he has passed a breath alcohol test. A solid state, fast acting sensor is employed in a special housing together with circuitry for requiring a breath sample of at least five seconds. A dual mode system is also disclosed whereby the sensor is switched into a carbon monoxide detection mode after engine is started.

16 Claims, 5 Drawing Figures

BREATH ALCOHOL DETECTOR AND AUTOMOTIVE IGNITION INTERLOCK EMPLOYING SAME

This invention relates to breath alcohol detectors and more particularly to an automotive safety system in which the automobile engine cannot be started until the operator successfully passes a breath alcohol test.

BACKGROUND OF THE INVENTION

There is a growing concern in the United States and abroad over the number of automobile accidents caused by persons who operate automobiles after consuming alcoholic beverages and other intoxicants. To combat this problem, many states have motor vehicle codes which specify that a person is illegally intoxicated and presumptively incapable of operating an automobile if his blood alcohol level exceeds a predetermined figure. Blood alcohol is measurable as a function of the percentage of alcoholic vapor in alveolar breath, i.e., deep lung breath, and accordingly, instrumentation has been developed for making relatively fast and relatively accurate readings of blood alcohol levels through analysis of breath samples. Such instruments are typically of the photometric type employing a fluid which undergoes a color change when alcohol is bubbled through it. The color or light transmissivity of the fluid is compared photometrically with that of a reference fluid and a reading proportional to the quantity of alcohol in the breath sample is provided.

Such devices require operation by trained personnel for reliable results and, further, suffer from the fact that the color change in the fluid is non-reversible, thus, requiring constant replacement of the fluid sample. Moreover, such devices do not really solve the basic problem with respect to intoxicated drivers, but are useful only in a law enforcement activity. In short, the prior art breath alcohol detector does not work to prevent an intoxicated person from operating an automobile.

BRIEF DESCRIPTION OF THE INVENTION

In accordance with the present invention, a fast acting alcohol sensor is employed in a breath alcohol detection system for motor vehicles which operates to prevent an intoxicated person from operating a motor vehicle. In general this is accomplished by means of a breath alcohol detector which is incorporated into an automotive ignition system interlock and which employs a sensor, preferably a solid-state device, which is responsive to exposure to alcohol and similar combustible hydrocarbon gases and vapors to produce an electrical signal. The system of the present invention further comprises means whereby a person may communicate a breath sample to the sensor, means responsive to the application of a sample to the sensor for producing a second electrical signal, and a logic system which is interconnected with the automobile starter to prohibit operation until the logic means has received a proper combination of first and second electrical signals to indicate the presence of a breath sample having less than a predetermined alcoholic content.

In accordance with the preferred embodiment of the invention, hereinafter described in greater detail, the sensor is a fast-acting, self-resetting semiconductor device which undergoes a resistance change when exposed to alcoholic and other high volatility hydrocarbon vapors. This resistance change is such as to produce a large voltage swing which is suitable for use in logic systems. The sensor of the preferred embodiment is disposed in a housing of such design as to permit the indirect application of a breath sample to the sensor without deleterious cooling effects which might arise from a direct flow of air at high velocity over the sensor body.

In the preferred embodiment of the invention, means are provided whereby the automotive vehicle operator is required to produce a deep lung sample before the ignition interlock will be released, thereby to prevent defeat of the system by providing shallow lung or mouth air for the test. This is accomplished by the provision of a pressure-sensitive switch in combination with the sensor housing to close a pair of electrical contacts only during the application of a breath sample to the sensor, and timing means such as a capacitive charging circuit which operates to release a solid-state relay only after the breath sample has been applied to the sensor for a predetermined time; e.g., 5 seconds.

In accordance with a second feature of the present invention, the alcohol vapor sensor may be used in a dual mode whereby it, first, operates in conjunction with the ignition interlock system to monitor breath alcohol samples and, secondly, operates in connection with a carbon monoxide indicator to provide a warning when the passenger compartment of an automobile, camper vehicle, or other similar vehicle becomes contaminated with exhaust fumes. In general, this is accomplished in a system wherein a switch is provided to selectively connect the sensor into either the ignition interlock or carbon monoxide system, said switch being normally biased such that the sensor is connected into the interlock system as soon as the automobile engine is turned off, but is responsive to engine operation to connect the sensor into the carbon monoxide detector system.

These and other features of the invention will be best understood by reference to the following specification which describes the specific embodiment of the invention in complete detail.

DETAILED DESCRIPTION OF THE SPECIFIC EMBODIMENT

Figure 1:
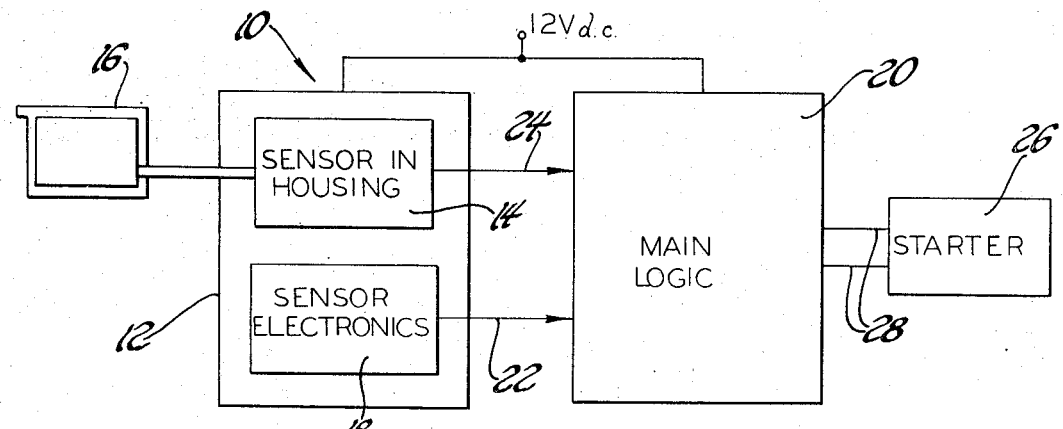
FIG. 1 is a block diagram of the electrical system of an illustrative embodiment of the breath alcohol ignition interlock.

Referring now to FIG. 1, a breath alcohol detector-ignition interlock system 10 for motor vehicles operates to prevent the actuation of an engine starter 26 until the vehicle operator submits a breath sample of at least five seconds duration and which contains less than a predetermined alcohol content. System 10 comprises a hand-held sample collection unit 12 which is located within the passenger compartment and, preferably, near the driver's seat. The hand-held sample collection unit 12 comprises a variable resistance alcohol vapor sensor disposed in a small subhousing 14, the sensor and housing being hereinafter described in greater detail with reference to FIG. 2, and a moisture trapping mouthpiece 16 which is provided for communicating breath samples to the sensor in the subhousing 14. Means are provided for producing an electrical signal on line 24 while the sample is being applied. The hand-held collection unit 12 further comprises sensor electronics 18 which respond to the resistance change in the semiconductor sensor upon application of a breath sample through the mouthpiece 16 to produce another electrical signal on line 22 proportional to the alcohol content of the sample.

System 10 further comprises a main logic unit 20, hereinafter described in greater detail with reference to FIG. 4, which interprets the signals provided by the hand-held unit 12 to determine whether or not the operator exhibits a breath alcohol level in excess of some predetermined quantity, usually prescribed by statute. For convenience, the signal on line 22 from the sensor electronics representing the alcoholic vapor quantity which is detected by the sensor in the breath sample submitted is hereinafter called the "first signal." Similarly, the signal applied to logic unit 20 on line 24 in response to the application of the breath sample is hereinafter called the "second signal." The main logic unit 20 is implemented to respond to the second electrical signal only if that signal is present for five seconds or more, thus, to ensure the application to the sensor of a deep-lung sample. The implementation of this and other anti-defeat mechanisms is hereinafter described. Fundamentally, the main logic unit 20 operates to permit the proper functioning of the motor vehicle engine starter 26 only if the operator submits a five-second breath sample having less than a predetermined level of alcohol in it. This is accomplished by activating starter voltage terminals 28 to apply twelve volts dc to the starter 26 only after the main logic unit 20 indicates that the breath alcohol sample has been collected and is within the allowable range.

Figure 2:
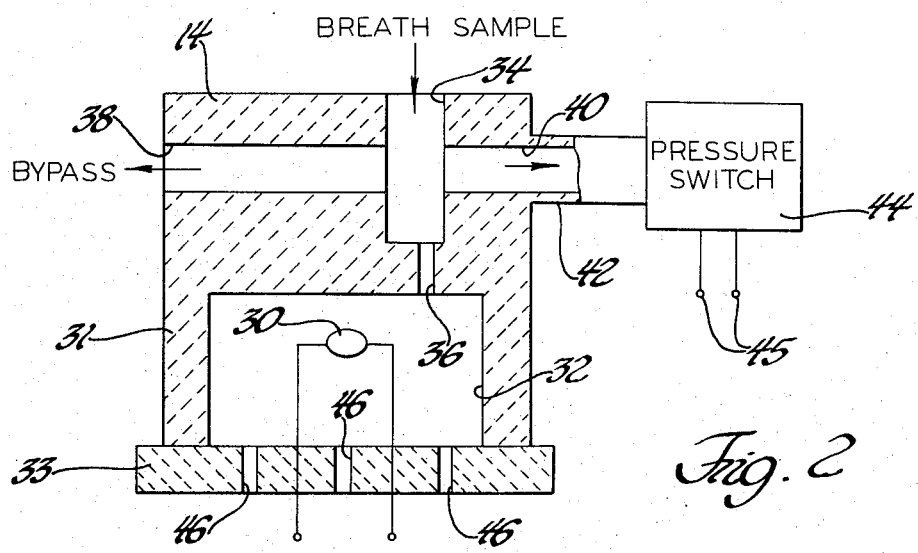
FIG. 2 is a cross-sectional view of a sensor housing.

Referring now to FIG. 2, the sensor subhousing 14 is shown in cross section. Housing 14 is preferably fabricated from plastic, ceramic, or other inert material having a high dielectric constant. The housing 14 comprises a main body portion 31 and a base portion 33, the two being suitably fastened or bonded together. The main body portion 31 is hollowed out to provide a sensor chamber 32 of relatively large dimension and within which a variable resistance semiconductor alcohol vapor sensor 30 is disposed. An inlet conduit 34 is provided to admit a breath sample and to communicate the breath sample to the sensor chamber 32 by way of a small restricted passage 36 which extends into the chamber 32 at a position which is offset relative to the location of the sensor 30. This prevents the direct impingement of a breath sample on the sensor 30, such direct impingement often being effective to cool the sensor and produce a possibly erroneous reading. Inlet 34 intersects a bypass passage 38 which shunts off most of the breath sample which is applied to the input housing 14. By way of example, the bypass passage 38 may be of approximately 150 mils in diameter whereas the restricted passage 36 may be on the order of 25 mils in diameter.

The sensor 30 which is disposed in the sensor chamber 32 is a small metal oxide semiconductor element having a resistance characteristic which changes in the presence of a contaminating gas, such as a highly volatile hydrocarbon vapor. A suitable device is available from Figaro Engineering, Inc. of Osaka, Japan and is described in the U.S. Pat. to Taguchi, No. 3,631,436. The normal resistance of the sensor 30 in uncontaminated air at room temperature is between 100,000 and 300,000 ohms, whereas the resistance in an atmosphere of heavy alcohol vapor is approximately 1,000 ohms. Accordingly, a small voltage source may be interconnected with the sensor 30 to provide a first electrical signal which varies in amplitude in accordance with and in proportion to the quantity of alcohol vapor in the breath sample which is applied to the inlet passage 34, thus, to provide one of the two significant signals which are employed in the breath alcohol detector of the present invention.

Inlet passage 34 also communicates directly to a second perpendicularly intersecting channel 40 which is connected to a short extension conduit 42 to apply a portion of the input breath sample to a pressure switch 44 for the purpose of generating the second electrical signal. The pressure switch comprises a pair of normally open contacts and a mechanical pressure-responsive device, such as a small diaphragm, to close the contacts to complete a circuit between terminals 45 whenever a breath sample is applied to the inlet passage 34. A suitable pressure switch is available from Fairchild, currently marketed under model No. PSF 100A.

Finally, the base 33 of housing 14 is provided with a plurality of outlet passages 46 to exhaust the breath sample from the sensor chamber 32.

Figure 3:
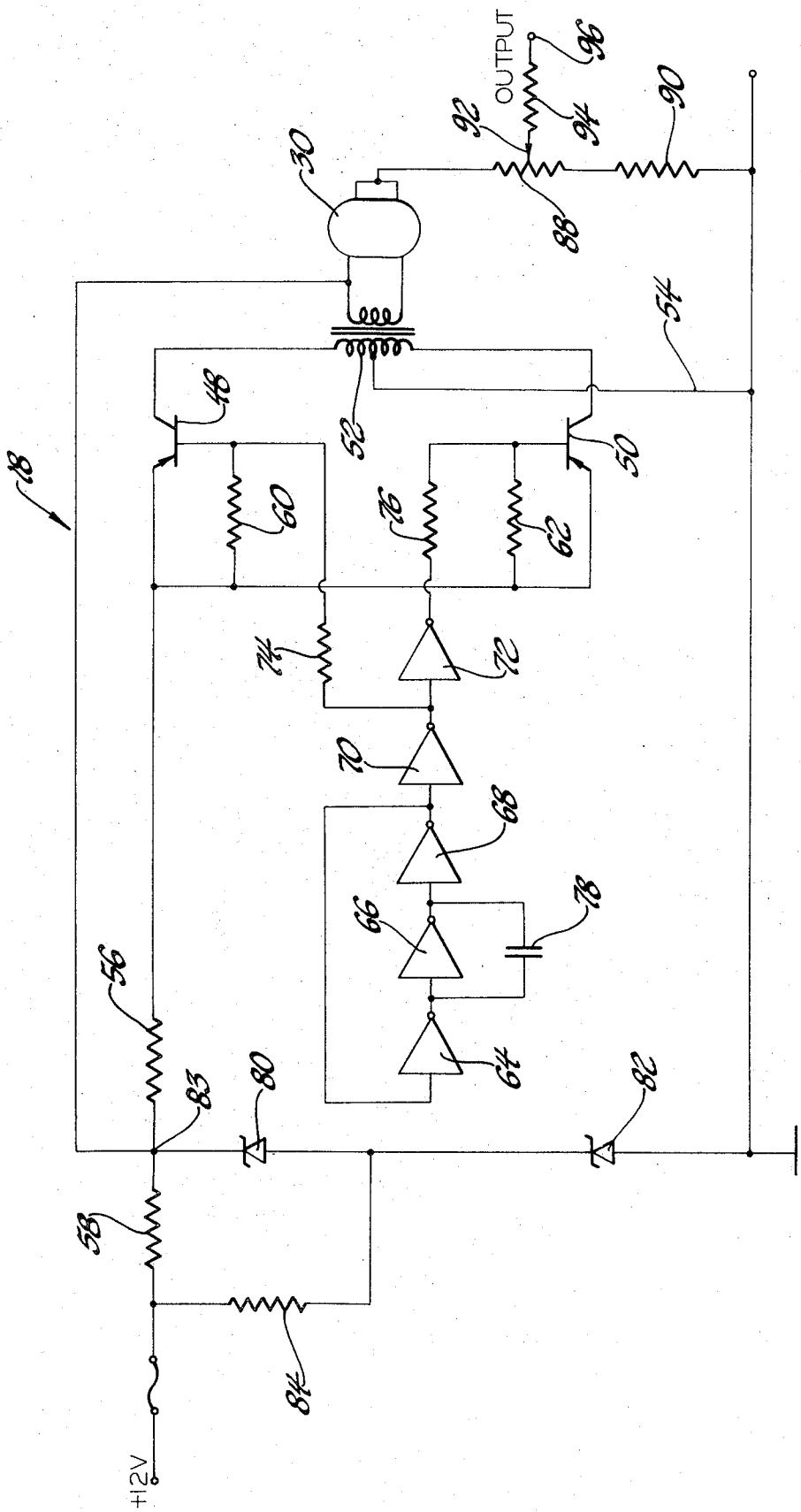
FIG. 3 is a detailed schematic diagram of the electronics associated with the sensor.

Referring now to FIG. 3, the schematic circuit diagram of the sensor electronics 18 will be described in detail. The function of the sensor electronics 18 is to provide a regulated dc supply voltage for use throughout the breath alcohol detection system electronics and also to provide suitable energization of the sensor 30 so as to provide an output signal which varies in proportion to the quantity of alcohol vapor detected. The metal oxide semiconductor sensor 30 marketed by Figaro Engineering is a four-terminal device which requires an ac energization voltage, analogous to a "heater" voltage for a vacuum tube, of approximately one volt RMS. This is provided by an inverter circuit comprising alternately conductive PNP type transistors 48 and 50 of which the collector electrodes are connected to opposite ends of a center-tapped primary winding 52. The center tap of winding 52 is connected to ground by way of conductor 54 as shown. The 12-volt supply is connected through resistors 56 and 58 to the emitter electrodes of transistors 48 and 50 and also through base bias resistors 60 and 62 to the base electrodes of the transistors. Toggling of the transistors 48 and 50 to opposite conductivity states is accomplished in the circuit of FIG. 3 by logic circuitry comprising series-connected inverters 64, 66, 68, 70, and 72. The output of inverter 70 is connected through resistor 74 to the base electrode of transistor 48 and the oppositely polarized output of inverter 72 is connected through resistor 76 to the base electrode of transistor 50. Inverters 64, 66, and 68 are connected in a closed loop by feedback line 77 as shown. Inverter 66 is provided with a capacitive feedback connection 78. Other implementations for a small, solid-state inverter will be apparent to those skilled in the art.

The regulated dc supply voltage is provided by series connected Zener diodes 80 and 82 which are connected between point 83 and ground. A resistor 84 is connected in shunt relationship to diode 80.

The output of sensor 30 is in the form of a dc current which varies in amplitude in accordance with the amount of alcohol vapor or other hydrocarbon contaminating gas to which the sensor is exposed. The dc output current flows through output load resistors 88 and 90 of which resistor 88 serves as part of an output potentiometer arrangement including movable tap 92 and output resistor 94. Accordingly, the output signal is developed between terminal 96 and ground, as shown, to represent the breath alcohol quantity. As previously described with reference to FIG. 1, the breath alcohol signal is applied by way of line 22 to the main logic 20 along with a signal indicating that the sample is being supplied and the main logic unit 20 operates to determine whether or not a satisfactory test has been conducted.

Figure 4:
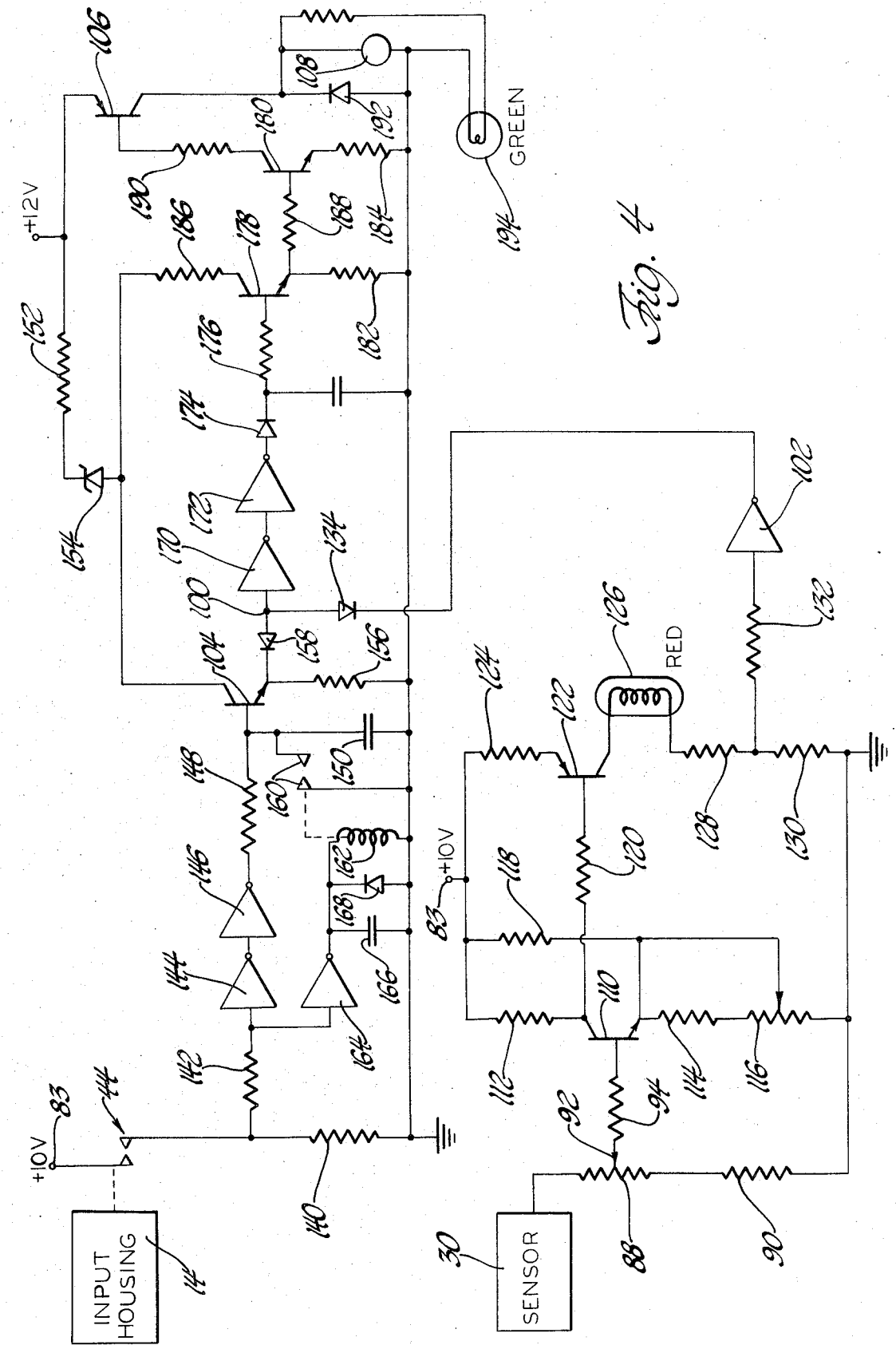
FIG. 4 is a detailed schematic diagram of the main logic electronics.

Looking now to FIG. 4, the main logic unit 20 is shown in schematic detail as well as the signal transmission relationship between the main logic, the sensor 30, and the breath sample pressure switch 44. The overall function of the main logic unit 20 is approximately as follows: if the first electrical signal applied to control terminal 100 by inverter 102 indicates a breath sample having less than a predetermined alcohol level and if the second electrical signal applied to control terminal 100 by NPN transistor 104 indicates that the breath sample has been of at least five seconds duration, then the normally nonconducting output transistor 106 is rendered conductive to apply the twelve-volt supply to a starter solenoid 108 thereby to enable the automobile engine to be started. If the first electrical signal from inverter 102 indicates a breath alcohol content of more than the predetermined level, the main logic unit 20 operates to maintain transistor 106 in the nonconducting condition. Similarly, if the second electrical signal indicates that the breath sample is too short for proper evaluation, then the transistor 106 is again maintained in the nonconducting state.

Looking more specifically to the circuit of FIG. 4, the sensor output resistor 94, previously described with reference to FIG. 3, is connected to the base or input electrode of transistor 110 to render the transistor conductive if and when sufficient current flows from the sensor 30 through resistors 88 and 90. The collector electrode of transistor 110 is connected to the regulated dc supply point 83 by way of resistor 112. The emitter electrode of transistor 110 is connected to ground through resistors 114 and 116, both resistors being interconnected with the regulated supply point 83 by way of variable taps and a current control resistor 118 to maintain the emitter of transistor 110 at a relatively fixed minimum potential. The collector electrode of resistor 110 is connected through a resistor 120 to the base electrode of transistor 122 to control the conductivity thereof. The emitter electrode of transistor 122 is connected to the regulated dc supply point 83 through a resistor 124. The collector electrode of transistor 122 is connected to ground through the series combination of a small red colored incandescent alcohol indicator lamp 126 and voltage divider resistors 128 and 130. The midpoint or junction between the resistors 128 and 130 is connected through resistor 132 to the input point of inverter 102. The output of inverter 102 is connected to the control point 100 through a diode 134.

The operation of the sensor signal portion of the main logic circuit of FIG. 4 is as follows: transistors 110 and 122 are normally nonconducting, thus, to maintain the incandescent lamp 126 in the off or unlighted condition and to apply a signal of one polarity to the control terminal 100 indicating no exposure of the sensor 30 to an alcohol vapor; upon exposure to alcohol, the resistance of sensor 30 decreases causing a current of amplitude proportional to the alcohol quantity in the breath sample to flow through resistors 88 and 90; if the current exceeds a predetermined value determined by the bias on transistor 110 set by resistors 114 and 116, transistor 110 is rendered conducting to produce a corresponding switch from a nonconducting to a conducting state in transistor 122; when transistor 122 is rendered conductive, the lamp 126 is caused to be lighted and a signal of opposite polarity is applied to the control termianl 100.

Looking now to the circuitry for generating the second electrical signal, i.e., the signal representing the application of the breath sample, the normally open contacts of the pressure switch 44 are connected in series between the regulated dc supply point 83 and ground through a resistor 140 to generate a voltage drop across the resistor whenever the contacts of the pressure-sensitive switch 144 are closed. This voltage is applied to a capacitive timing circuit which controls the voltage which is applied to the base electrode of transistor 104 through the series combination of a resistor 142, inverters 144 and 146, and resistor 148. The common junction between resistor 148 and the base electrode of transistor 104 is connected to ground through timing capacitor 150 which charges up as long as the pressure-sensitive switch contacts are closed. The capacitor 150 charges up to a suitable voltage to render transistor 104 conducting after approximately five seconds. When transistor 104 conducts, current flows from the 12-volt supply through a resistor 152 and a Zener diode 154, the collector-emitter circuit of transistor 104 and resistor 156 to ground. This applies the second electrical signal to the control terminal 100 by way of a diode 158.

As shown in FIG. 4, capacitor 150 is permitted to charge only if parallel connected contacts 160 are open. Contacts 160 are normally closed to short circuit the capacitor 150 but are opened whenever current is applied to coil 162. The coil 162 is connected to the regulated 10-volt supply through the contacts of pressure-sensitive switch 44 and also through the combination of an inverter 164 having an input point commonly to the input point of inverter 144, and the parallel combination of capacitor 166 and diode 168. Accordingly, whenever the contacts of pressure-sensitive switch 44 are opened, the solenoid coil 162 is unenergized and the contacts 160 close to short circuit the capacitor 150. This prevents the increase in the voltage supplied to the base of transistor 104 and holds the transistor in the nonconducting condition. On the other hand, when the contacts of pressure sensitive switch 44 are closed, coil 162 is energized to open contacts 160 and to permit the capacitor 150 to charge. If and only if the contacts of switch 44 are closed for at least 5 seconds, does the capacitor 150 charge sufficiently to render transistor 104 conducting. If the breath sample is shorter than a 5-second duration, contacts 160 close and discharge the capacitor 150 requiring the subject undergoing test to reapply another breath sample of sufficient duration.

The voltage from the control terminal 100 in the circuit of FIG. 4 is applied to the output transistor 106 for control purposes through the combination of inverters 170 and 172, diode 174, resistor 176, and amplifier transistors 178 and 180. The emitter electrodes of transistors 178 and 180 are connected to ground through resistors 182 and 184, respectively. The collector electrode of transistor 178 is connected to the 12-volt supply through resistor 186. The emitter electrode of transistor 178 is also connected to the base or input electrode of transistor 180 through a small bias resistor 188. The collector electrode of transistor 180 is connected to the base electrode of output transistor 106 through resistor 190. The starter solenoid 108 is connected in parallel with a diode 192 and a green colored incandescent lamp 194 which may be located in proximity to the red colored incandescent lamp 126 to give a complemental output signal; i.e., lighting of lamp 126 indicates the alcohol present or "no-go" signal whereas the lighting of lamp 194 indicates the subject ready or "go" signal.

The overall operation of the main logic circuit 20 of FIG. 4 is easily understood by focussing on the control point 100 and recognizing that the combination of diodes 134 and 158 and inverter 170 constitute a logical NAND gate having two inputs and an output. All 1 outputs of the NAND gate are associated with the "no-go" condition and all 0 outputs are associated with the "go" condition. Moreover, the 0 output condition of the NAND gate, i.e., the 0 output of inverter 170, is produced only when the first electrical signal from inverter 102 is a 1 and the second electrical signal from transistor 104 is also a 1. A 1 output is produced by inverter 102 at all times except those which correspond with the conducting condition of transistor 122. As previously described, transistor 122 is rendered conducting only when the sensor 30 detects and alcohol vapor quantity above a predetermined level. A 1 in the second electrical signal applied to the NAND gate is present whenever transistor 104 is conducting. This condition obtains only when a breath sample of at least a 5-second duration is applied. Any other condition at the input to the NAND gate previously defined results in a 1 output condition which corresponds to the "no-go" condition and disables the starter by maintaining output transistor 106 in the nonconducting state.

It will be readily appreciated by those skilled in the art that the control terminal implementation of the circuit of FIG. 4 permits any number of additional signal quantities to be logically combined with those described in detail herein. By way of example, it may be advisable to provide a humidity detector in the sensor chamber 32 of the input housing 14 to distinguish between alveolar breath samples which are high in humidity and other air sources such as bottles and balloons which are typically low in humidity, thus, to prevent defeat of the system by devious means. Such a humidity detector may provide a third logical signal to be applied to the control terminal 100 to be logically combined with the other two before the "go" condition will be indicated by a change in conductivity of transistor 106. As another example, a galvanic skin resistance test may be provided by means of contacts on the handheld unit 12 to sense a condition of high agitation and emotional unbalance in the subject. Other testing devices may also be employed in view of the versatility of the circuit of FIG. 4.

It will be apparent to those skilled in electronic circuit theory that the 0 output of the inverter 170 is again inverted by inverter 172 to render transistor 178 conducting. When transistor 178 is conducting transistors 180 and 106 are correspondingly rendered conducting to energize the starter solenoid 108 and to light the "go" incandescent lamp 194.

Figure 5:
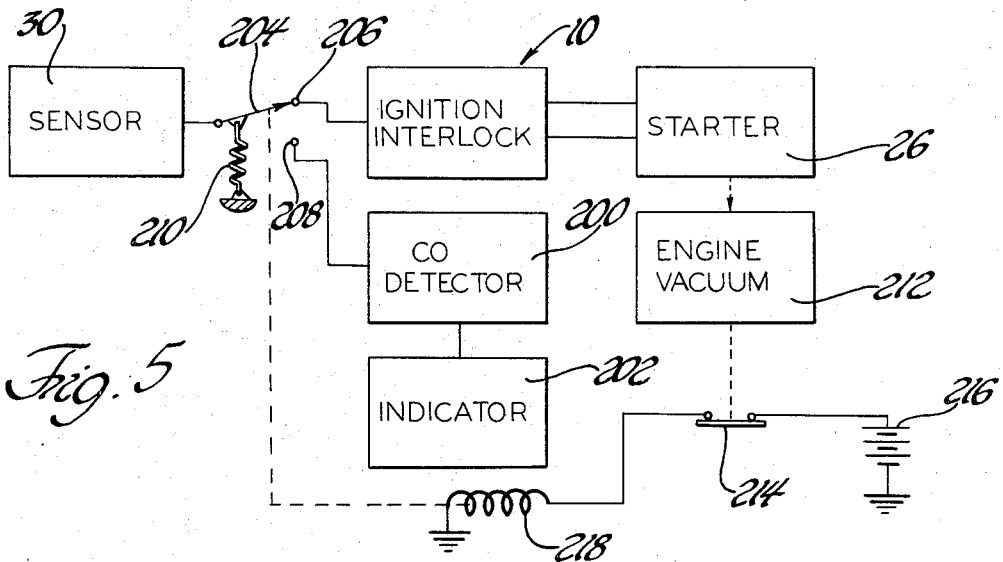
FIG. 5 is a block diagram of an illustrative embodiment of the dual function sensor system of the present invention.

Referring now to FIG. 5, a still further variation on the use of a solid-state hydrocarbon gas sensor is shown. In FIG. 5, the sensor 30 is employed in a dual mode of which the first mode involves operative interconnection with the ignition interlock system 10 which has been previously described as controlling the function of the engine starter 26. The second mode of operation involves operative connection of the sensor 30 into a carbon monoxide detector unit 200 having a suitable indicator 202, such as a lamp or buzzer or combination of such devices, whenever the vehicle engine is running.

As shown in FIG. 5, this dual mode operation is accomplished by connecting the sensor 30 through a switch 204 which is selectively movable between contact terminals 206 and 208. Switch 204 is shown in FIG. 5 to comprise a mechanical spring or other device 210 to bias the switch 204 into contacts with terminal 206 whereby the sensor 30 is interconnected with the ignition interlock system 10 to operate in the manner previously described herein. However, once the engine has been started to actuate an engine vacuum source 212, such as that used to operate windshield wipers and the like, the bias exerted on switch 204 by spring 210 is overcome and the switch 204 is moved into engagement with terminal contact 208 to switch the sensor 30 into the carbon monoxide detector system 200. This is accomplished by means of a vacuum-operated switch 214 which is connected between a dc source 216 and a relay coil 218 which controls the position of switch 204 by electromagnetic attraction. Switch 214 is normally open so as to deenergize the coil 18, but is closed by the engine vacuum source 212 to complete a circuit from the source 216 through the coils 218. The flow of current through coil 218 actuates the relay and pulls the switch 204 into engagement with contact terminal 208.

The sensor 30, being disposed in the hand-held unit 12 of FIG. 1 is normally in residence within the passenger compartment of the vehicle where it is advisable to continuously monitor carbon monoxide level so as to avoid an air contamination condition that may be sufficient to overcome the occupants of the passenger compartment. The indicator 202 is also preferably disposed within the passenger compartment where it can be easily seen and/or heard by the occupants of the vehicle. Whenever the engine is shut off, the switch 214 opens and resets the switch 204 to connect the sensor 30 with the ignition interlock system 10 as previously described.

It is to be understood that the specific embodiments of the invention described above are illustrative in nature and are not to be construed in a limiting sense.

The embodiments of the invention in which an exclusive property or privilege is claimed are defined as follows:

1. A breath alcohol detection system for motor vehicles comprising: a sensor responsive to exposure to alcoholic vapor in a breath sample for producing a first electrical signal; input means for communicating breath samples to the sensor; means responsive to the application of a sample to said input means for producing a second electrical signal independent of the alcohol content of the sample; and logic means connected to simultaneously receive the first and second signals for producing an output condition to enable normal engine operation only when the combination of the first and second signals indicates a breath sample having less than a predetermined alcoholic content.

2. A breath alcohol detection system as defined in claim 1 wherein said means responsive to the application of a sample comprises a pressure switch having normally open contacts, said contacts being closed by and during the application of said sample.

3. A breath alcohol detection system as defined in claim 1 wherein said sensor comprises a semiconductor element having a resistance characteristic which changes on exposure to an alcoholic vapor.

4. A breath alcohol detection system as defined in claim 3 wherein said input means comprises a housing having an inlet, an outlet, and a sensor chamber between the inlet and outlet, said semiconductor element being disposed in said chamber, and a restricted passage between said inlet and chamber for communicating a breath sample into the chamber.

5. A breath alcohol detection system as defined in claim 4 wherein said restricted passage and said element are relatively disposed so that the sample avoids direct impingement on said element.

6. A breath alcohol detection system as defined in claim 4 wherein said means responsive to the application of a sample includes a pressure responsive switch connected to the inlet of the housing and responsive to the pressure of a breath sample to complete an electrical circuit therethrough.

7. A breath alcohol detection system as defined in claim 6 wherein said housing includes a bypass path connected to the inlet to bleed off a portion of the breath sample.

8. A breath alcohol detection system as defined in claim 1 including timing means connected between said means responsive to the application of a sample and said logic means for delaying the transmission of said second electrical signal to said logic means until said second electrical signal persists for a predetermined time.

9. A breath alcohol detection system as defined in claim 1 wherein said means responsive to the application of a sample includes a pair of normally open contacts, pressure sensitive means connected between the input means and the contacts for closing the contacts when a breath sample is present, a transistor having input and output electrodes, and means including a capacitive charging circuit connected between the contacts and input electrode to control the conductivity of the transistor when the contacts are closed long enough to charge the capacitive circuit.

10. A breath alcohol detection system as defined in claim 9 including reset means for discharging the capacitive circuit when the contacts are opened.

11. An ignition interlock system for preventing the operation of a motor vehicle until an operator submits a breath sample having less than a predetermined alcohol content comprising: input means for receiving a breath sample, a sensor operatively connected to the input means for exposure to the breath sample and responsive to the alcohol content thereof to produce an electrical signal quantity related to said content, and circuit means connected to operate on said electrical signal quantity to disable a vehicle engine from starting until a breath sample having less than a predetermined alcohol content is submitted.

12. Motor vehicle safety apparatus comprising: a sensor responsive to exposure to combustible gases to undergo a resistance change, first electronic means for disabling an automobile engine starter due to alcohol concentrations on human breath, second electronic means for indicating carbon monoxide gas levels in the passenger compartment of said automobile; and control means including a switch for selectively connecting the sensor to the first and second electronic means, said control means further including means normally connecting the sensor to the first electronic means, and means responsive to the starting of the engine to connect the sensor to the second electronic means.

13. A breath alcohol detection system for inhibiting the starting of the engine of a motor vehicle until the operator has submitted a deep lung breath sample comprising in combination: a semiconductor sensor device having a varying resistance characteristic upon exposure to alcoholic vapor in a breath sample for producing a first electrical signal representing the alcoholic content of a breath sample; input means for communicating breath samples to the sensor; means operatively associated with the input means and responsive to the application of a sample to said input means for producing a second electrical signal independent of the alcohol content of the sample; said last mentioned means including timing means for producing said second electrical signal only after a predetermined period of application, thereby to ensure that the sample is alveolar breath; and logic means connected to simultaneously receive both the first and second signals and to logically combine such signals for producing an output condition to enable operation of the engine starter only when the combination of the first and second signals indicates a breath sample of said predetermined duration and having less than a predetermined alcohol content.

14. A breath alcohol detection system as defined in claim 13 further including means for producing an amplitude regulated dc voltage, inverter means connected to receive the regulated dc voltage for producing a regulated ac voltage and means for applying the ac voltage as an excitation signal to the sensor.

15. A breath alcohol detection system as defined in claim 13 wherein said logic means includes a signal logic inverter connected to receive the first signal and to assume a first output condition when the breath sample contains less than the predetermined alcohol content and to assume a second output condition when the breath sample contains more than the predetermined alcohol content, an amplifier circuit having a summing junction input, the output of the logic inverter being connected to the summing junction input, said second signal also being connected to the summing junction input to logically combine the inverter output with the second signal, and an output semiconductor switch having a normally open circuit condition, said switch being connected to the amplifier circuit to be placed in a closed circuit condition only when the logical combination of the inverter output and the second signal indicate the submission of a breath sample of at least the predetermined duration and having less than the predetermined alcohol content.

16. A breath alcohol detection system as defined in claim 13 wherein the timing means comprises a capacitor, means for charging the capacitor during submission of a breath sample, means for producing the second electrical signal only after the capacitor reaches a predetermined charge, and means for discharging the capacitor after application of the sample.

* * * * *

Notice of Adverse Decision in Interference

In Interference No. 99,130, involving Patent No. 3,780,311, R. V. Brown, BREATH ALCOHOL DETECTOR AND AUTOMOTIVE IGNITION INTERLOCK EMPLOYING SAME, final judgment adverse to the patentee was rendered Aug. 26, 1976, as to claims 1, 2, 3, 4, 5, 6, 7, 8, 9, 10, 11, 13 and 16.

[*Official Gazette November 30, 1976.*]